(12) United States Patent
Won

(10) Patent No.: US 12,470,910 B2
(45) Date of Patent: Nov. 11, 2025

(54) USER EQUIPMENT AND METHOD FOR WARNING MESSAGES DELIVERY IN PRIVATE NETWORKS

(71) Applicant: NOKIA TECHNOLOGIES OY, Espoo (FI)

(72) Inventor: Sung Hwan Won, Flower Mound, TX (US)

(73) Assignee: NOKIA TECHNOLOGIES OY, Espoo (FI)

(*) Notice: Subject to any disclaimer, the term of this patent is extended or adjusted under 35 U.S.C. 154(b) by 324 days.

(21) Appl. No.: 17/798,394

(22) PCT Filed: Feb. 10, 2020

(86) PCT No.: PCT/US2020/017421
§ 371 (c)(1),
(2) Date: Aug. 9, 2022

(87) PCT Pub. No.: WO2021/162673
PCT Pub. Date: Aug. 19, 2021

(65) Prior Publication Data
US 2023/0070106 A1 Mar. 9, 2023

(51) Int. Cl.
*H04W 8/18* (2009.01)
*H04W 84/04* (2009.01)

(52) U.S. Cl.
CPC .......... *H04W 8/183* (2013.01); *H04W 84/042* (2013.01)

(58) Field of Classification Search
CPC ....... H04W 4/90; H04W 48/18; H04W 8/183; H04W 4/12; H04W 60/04; H04W 76/50; H04W 84/042; G06F 8/61; G06F 9/4401; H04L 63/0492; H04L 63/08; H04L 63/0823

See application file for complete search history.

(56) References Cited

U.S. PATENT DOCUMENTS

| | | |
|---|---|---|
| 2006/0218296 A1 | 9/2006 | Sumner |
| 2009/0176511 A1 | 7/2009 | Morrison |
| 2010/0035575 A1 | 2/2010 | Wu |
| 2011/0022698 A1 | 1/2011 | Salam et al. |

(Continued)

FOREIGN PATENT DOCUMENTS

| | | |
|---|---|---|
| CN | 101180627 A | 5/2008 |
| CN | 101433035 A | 5/2009 |

(Continued)

OTHER PUBLICATIONS

International Search Report and Written Opinion dated May 26, 2020 corresponding to International Patent Application No. PCT/US2020/017421.

(Continued)

*Primary Examiner* — Khalid W Shaheed
(74) *Attorney, Agent, or Firm* — SQUIRE PATTON BOGGS (US) LLP

(57) ABSTRACT

User equipment and method for receiving warning messages in a non-public mobile communications network. The user equipment accepts or ignores warning messages received in the non-public mobile communications network based on a warning messages reception configuration stored in a memory of the user equipment such as a memory of the mobile equipment part of the user equipment.

11 Claims, 6 Drawing Sheets

(56) References Cited

U.S. PATENT DOCUMENTS

| | | | |
|---|---|---|---|
| 2013/0191627 | A1 | 7/2013 | Ylonen et al. |
| 2014/0273909 | A1 | 9/2014 | Ballantyne et al. |
| 2014/0273910 | A1 | 9/2014 | Ballantyne et al. |
| 2015/0280845 | A1 | 10/2015 | Ballakur et al. |
| 2016/0006760 | A1 | 1/2016 | Lala et al. |
| 2016/0337130 | A1 | 11/2016 | Buckley et al. |
| 2019/0110182 | A1* | 4/2019 | Liu .................... H04W 4/06 |

FOREIGN PATENT DOCUMENTS

| | | |
|---|---|---|
| CN | 102450038 A | 5/2012 |
| CN | 103650452 A | 3/2014 |
| CN | 105027606 A | 11/2015 |
| CN | 110612728 A | 12/2019 |

OTHER PUBLICATIONS

3GPP TS 23.122 V16.4.0 (Dec. 2019), Technical Specification, 3rd Generation Partnership Project; Technical Specification Group Core Network and Terminals; Non-Access-Stratum (NAS) functions related to Mobile Station (MS) in idle mode (Release 16), Dec. 2019.
3GPP TS 31.101 V15.2.0 (Sep. 2019), Technical Specification, 3rd Generation Partnership Project, Technical Specification Group Core Network and Terminals; UICC-terminal interface; Physical and logical characteristics (Release 15), Sep. 2019.
3GPP TS 24.002 V16.0.0 (Dec. 2019), Technical Specification, 3rd Generation Partnership Project, Technical Specification Group Core Network and Terminals; GSM—UMTS Public Land Mobile Network (PLMN) Access Reference Configuration (Release 16), Dec. 2019.
3GPP TS 23.501 V16.3.0 (Dec. 2019), Technical Specification, 3rd Generation Partnership Project; Technical Specification Group Services and System Aspects; System architecture for the 5G System (5GS); Stage 2 (Release 16), Dec. 2019.
3GPP TS 31.102 V16.2.0 (Dec. 2019), Technical Specification, 3rd Generation Partnership Project, Technical Specification Group Core Network and Terminals; Characteristics of the Universal Subscriber Identity Module (USIM) application (Release 16), Dec. 2019.
3GPP TS 23.041 V16.2.0 (Dec. 2019), Technical Specification, 3rd Generation Partnership Project; Technical Specification Group Core Network and Terminals; Technical realization of Cell Broadcast Service (CBS) (Release 16), Dec. 2019.
Extended European Search Report dated Jul. 3, 2023, corresponding to European Patent Application No. 20918333.4.
3rd Generation Partnership Project; Technical Specification Group Core Network and Terminals; Technical realization of Cell Broadcast Service (CBS) (Release 16), 3GPP Standard; Technical Specification; 3GPP TS 23.041, 3rd Generation Partnership Project (3GPP), Mobile Competence Centre ; 650, Route Des Lucioles ; F-06921 Sophia-Antipolis Cedex ; France, vol. CT WG1, No. V16.2.0 Dec. 19, 2019 (Dec. 19, 2019), pp. 1-98.
Adverse Formalities Report from the National Office of Intellectual Property of Vietnam (NOIP) dated Sep. 16, 2022, corresponding to Vietnam Patent Application No. 1-2022-05390.
ETSI TS 102 900 V1.3.1 (Feb. 2019), Technical Specification, Emergency Communications (EMTEL); European Public Warning System (EU-ALERT) using the Cell Broadcast Service; 650 Route des Lucioles; F-06921 Sophia Antipolis Cedex, France. pp. 1-16.
Office Action dated Feb. 9, 2023, corresponding to Indian Patent Application No. 202247050806.
Communication under Rule 71(3) EPC dated Mar. 28, 2025 corresponding to European Patent Application No. 20918333.4.
Notice of the Result of Substantive Examination Pursuant to Article 62(3) of Indonesian Patent Law No. 13/2016 dated May 14, 2025 corresponding to Indonesian Patent Application No. P00202209267, with English translation thereof.
Office Action dated May 15, 2025 corresponding to Vietnamese Patent Application No. 1-2022-05390, with English translation thereof.
First Office Action dated Feb. 13, 2025 corresponding to Chinese Patent Application No. 202080098939.X, with English translation thereof.
Second Office Action dated Jul. 26, 2025 corresponding to Chinese Patent Application No. 202080098939.X, with English translation thereof.
Yun-Zhong Yan et al., Unattended substation system based on SMS of GSM, Electric Power Automation Equipment, vol. 27, No. 3, Mar. 2007.
Huawei, "36.300 Running CR to Implement Stage 2 Agreements on NB-IoT," R2-162310, 3GPP TSG-RAN WG2 Meeting #93bis, Dubrovnik, Croatia, Apr. 2, 2016.

* cited by examiner

| | | | | Warning |
|---|---|---|---|---|
| SUPI | Credentials | SNPN ID | Access Control | Messages 530 |
| | | A | | 0 |
| | | B | | 1 |
| | | C | | 10 |
| | | D | | 1 |
| | | E | | 0 |

520

List of subscriber data 550

FIG. 6

USER EQUIPMENT AND METHOD FOR WARNING MESSAGES DELIVERY IN PRIVATE NETWORKS

FIELD

The subject matter described herein generally relates to cellular systems and more particularly, to cellular systems including private networks. Yet more particularly, the subject matter described herein relates to delivery and reception of warning messages.

BACKGROUND

Public cellular networks support sending and receiving warning messages. For example, specification 3GPP TS 23.041 V16.2.0 defines warning message delivery for GSM (Global System for Mobile Communications, 2G), UMTS (Universal Mobile Telecommunication System, 3G) and E-UTRAN (Evolved UMTS Terrestrial Radio Access, 4G) (TS 23.041 V16.2.0, subclause 9.1.3). This functionality is briefly referred to as PWS (Public Warning System) and allows the network to distribute warning messages on behalf of public authority. Use cases are, for example, an earthquake and tsunami warning system (ETWS), the EU Alert system according to ETSI TS 102 V1.3.1 or the Korean Public Alert System (KPAS), as well as other international, national or regional warning systems.

Technology-wise, in GSM and UMTS, the cell broadcast service (CBS) can be used to transfer CBS messages related to public warning. CBS which permits a number of unacknowledged messages to be broadcast to all receivers within a particular region of a cellular network, known as cell broadcast area comprising one of more cells. This requires reception of CBS messages to be permanently activated in the mobile terminal.

3GPP TS 31.102 defines a USIM (Universal Subscriber Identity Module) data file for configuration of warning messages reception. In case of a non-existing or empty USIM data file, the Mobile Station (MS)/User Equipment (UE) accepts all warning messages on all Public Land Mobile Networks (PLMNs). As specified in subclause 4.2.96 of 3GPP TS 31.102 V16.2.0, the MS/UE can be configured to ignore all warning messages received in its Home Public Land Mobile Network (HPLMN) or in a PLMN equivalent to it. As also specified in 3GPP TS 31.102, the MS/UE can be configured to ignore all warning messages received in a Visited Public Land Mobile Network (VPLMN) or in a PLMN equivalent to it.

Specifications also prescribe MS/UE support for non-public cellular networks. For example, 3GPP TS 23.501 V16.3.0 specifies support for a 5G Stand-alone Non-Public Network (SNPN), i.e. a network operated by a Non-Public Network operator which does not rely on network functions provided by a PLMN.

SUMMARY

According to an aspect, there may be provided a user equipment operable in a non-public mobile communications network comprising at least one processor; and at least one memory including computer program code and a warning messages reception configuration, wherein the computer program code causes the user equipment, when executed with the at least one processor, to accept or ignore warning messages received in the non-public mobile communications network based on the warning messages reception configuration.

In some embodiments, the non-public mobile communications network is a stand-alone non-public network, SNPN.

In some embodiments, the user equipment further comprises a mobile equipment, ME, and the warning messages reception configuration is provided in the ME.

In some embodiments, the warning messages reception configuration is provided in a list of subscriber data.

In some embodiments, the computer program code causes the user equipment, when executed with the at least one processor, to process the warning messages reception configuration during a network selection procedure.

In some embodiments, the user equipment further comprises a universal subscriber identity module, USIM, data file including a configuration of warning messages reception in public land mobile networks, PLMNs, wherein the computer program code causes the user equipment, when executed with the at least one processor, to use the USIM data file for configuring warning messages reception when the UE is not operating in an SNPN access mode, use the warning messages reception configuration in the ME for configuring warning messages reception when the UE is operating in the SNPN access mode.

In some embodiments, the computer program code causes the user equipment, when executed with the at least one processor, to accept warning messages on a selected SNPN if an entry of the list of subscriber data used in the selected SNPN does not include a warning messages reception configuration or includes a warning messages reception configuration indicating that the UE is to accept warning messages in the SNPN.

In some embodiments, the computer program code causes the user equipment, when executed with the at least one processor, to ignore warning messages on the selected SNPN if the entry of the list of subscriber data used in the selected SNPN indicates that the UE is to ignore warning messages.

In some embodiments, the warning messages reception configuration is a multi-dimensional parameter indicating that the UE accepts or ignores warning messages in the non-public communications network and other non-public communications networks equivalent to the non-public communications network.

According to a further aspect, a method is provided in a user equipment operable in a non-public mobile communications network, the method comprising accepting or ignoring warning messages received in the non-public mobile communications network based on a warning messages reception configuration provided in a memory of the user equipment.

In some method embodiments, the non-public mobile communications network is a stand-alone non-public network, SNPN.

In some method embodiments, the warning messages reception configuration is provided in a mobile equipment, ME, of the user equipment.

In some method embodiments, the warning messages reception configuration is provided in a list of subscriber data.

In some embodiments, the method comprising processing the warning messages reception configuration during a network selection procedure.

In some embodiments, the user equipment further comprises a universal subscriber identity module, USIM, data file including a configuration of warning messages reception in public land mobile networks, PLMNs, and the method comprises using the USIM data file for configuring warning messages reception when the UE is not operating in an SNPN access mode, using the warning messages reception configuration in the ME for configuring warning messages reception when the UE is operating in the SNPN access mode.

In some embodiments, the method comprising accepting warning messages on a selected SNPN if an entry of the list of subscriber data used in the selected SNPN does not include a warning messages reception configuration or includes a warning messages reception configuration indicating that the UE is to accept warning messages in the SNPN.

In some embodiments, the method comprises ignoring warning messages on the selected SNPN if the entry of the list of subscriber data used in the selected SNPN indicates that the UE is to ignore warning messages.

In some method embodiments, the warning messages reception configuration is a multi-dimensional parameter indicating that the UE accepts or ignores warning messages in the non-public communications network and other non-public communications networks equivalent to the non-public communications network.

According to a further aspect, a computer program product comprises program instructions stored on a computer readable medium to execute the method steps according to any one of the method embodiments outlined above when said program is executed on a computer.

The above-noted aspects and features may be implemented in systems, apparatuses, methods, articles and/or non-transitory computer-readable media depending on the desired configuration. The subject matter described herein may be implemented in and/or used with a number of different types of devices, including but not limited to cellular phones, tablet computers, wearable computing devices, portable media players, and any of various other computing devices.

This summary is intended to provide a brief overview of some of the aspects and features according to the subject matter described in this document. Accordingly, it will be appreciated that the above-described features are merely examples and should not be construed to narrow the scope of the subject matter described herein in any way. Other features, aspects, and advantages of the subject matter described herein will become apparent from the following detailed description, drawings and claims.

BRIEF DESCRIPTION OF THE DRAWINGS

A better understanding of the subject matter described herein can be obtained when the following detailed description of various embodiments is considered in conjunction with the following drawings, in which:

FIG. 6 shows a list of subscriber data with the warning messages reception configuration according to some embodiments.

DETAILED DESCRIPTION

Figure 1:
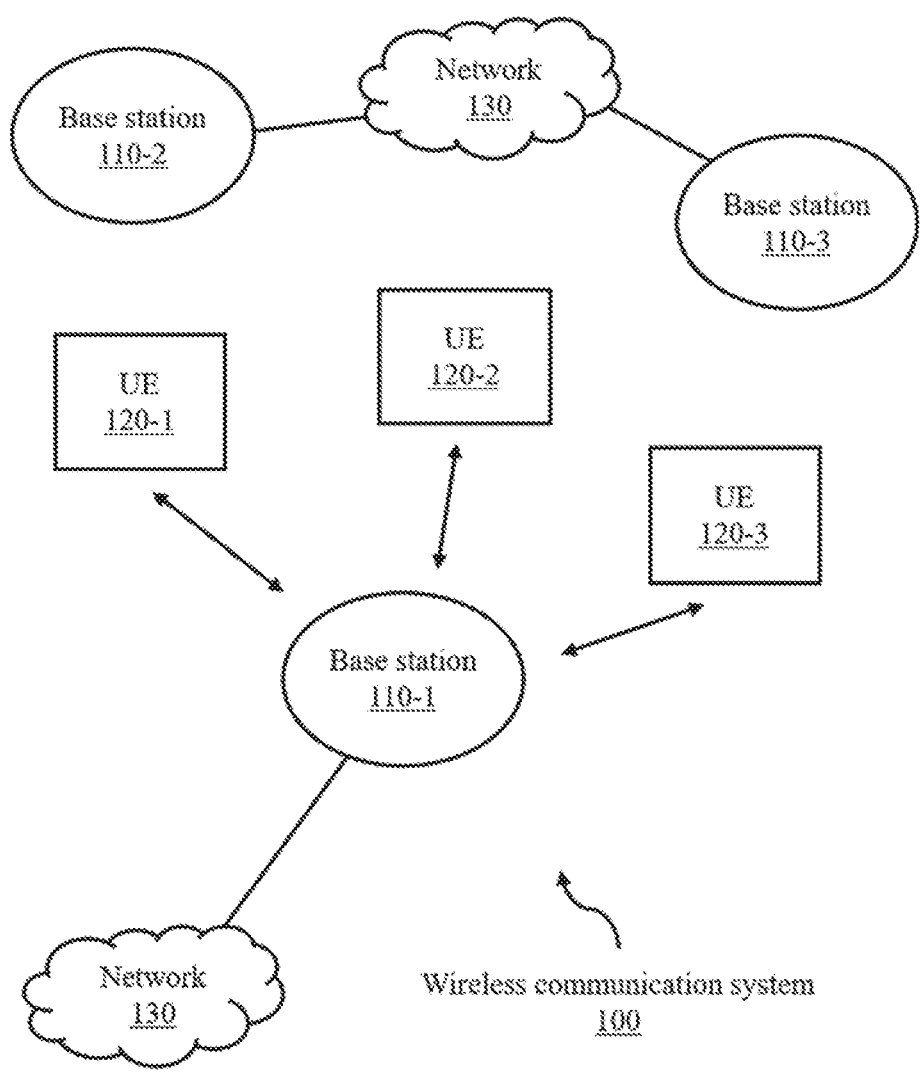
FIG. 1 illustrates a simplified wireless communication system, according to some embodiments.

FIG. 1 illustrates a simplified wireless communication system 100, according to some embodiments. It is noted that the system of FIG. 1 is merely one example of a possible system, and that features of the subject matter described herein may be implemented in any of various systems, as desired.

As shown, the wireless communication system 100 includes a base station 110-1 which communicates over a transmission medium with one or more user devices 120. In FIG. 1, only three user devices 120-1, 120-2, and 120-3 are shown, without limitation. Each of the user devices 120-1, 120-2, and 120-3 may be referred to herein as a "user equipment" (UE). Thus, the user devices 120 are referred to as UEs or UE devices.

As used herein, the term "user equipment" may refer to any of various types of computer systems devices which are mobile or portable and which perform wireless communications. Examples of UEs include mobile telephones or smart phones, portable gaming devices, laptops, wearable devices (e.g., smart watch, smart glasses), Personal Digital Assistants (PDAs), portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

The base station (BS) 110-1 may be a base transceiver station (BTS) or cell site (a "cellular base station"), and may include hardware that enables wireless communication with the UEs 120.

As used herein, the term "base station" has the full breadth of its ordinary meaning, and at least includes a wireless communication station installed at a fixed location and used to communicate as part of a wireless telephone system or radio system.

The communication area (or coverage area) of the base station 110 may be referred to as a "cell." The base station 110 and the UEs 120 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. If the base station 110-1 is implemented in the context of LTE, it may alternately be referred to as an "eNodeB" or "eNB". If the base station 110-1 is implemented in the context of 5G NR, it may alternately be referred to as "gNodeB" or "gNB".

As shown, the base station 110-1 may also be equipped to communicate with a network 130 (e.g., a core network of a cellular service provider, a telecommunication network such as a public switched telephone network (PSTN), and/or the Internet, among various possibilities). Thus, the base station 110-1 may facilitate communication between the user devices 120 and/or between the user devices 120 and the network 130. In particular, the cellular base station 110-1 may provide UEs 120 with various telecommunication capabilities, such as voice, SMS and/or data services.

The base station 110-1 and other similar base stations (such as base stations 110-2 and 110-3) operating according to the same or a different cellular communication standard may thus be provided as a network of cells, which may provide continuous or nearly continuous overlapping service to UEs 120 and similar devices over a geographic area via one or more cellular communication standards.

Thus, while base station 110-1 may act as a "serving cell" for UEs 120 as illustrated in FIG. 1, each UE 120 may also be capable of receiving signals from (and possibly within communication range of) one or more other cells (which might be provided by base stations 110 and/or any other base stations), which may be referred to as "neighboring cells". Such cells may also be capable of facilitating communication between user devices 120 and/or between user devices 120 and the network 130. Such cells may include "macro" cells, "micro" cells, "pico" cells, and/or cells which provide any of various other granularities of service area size. For example, base stations 110-1 and 110-2 illustrated in FIG. 1 might be macro cells, while base station 110-3 might be a micro cell. Other configurations are also possible.

In some embodiments, base station 110-1 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

The UE 120 may be capable of communicating using multiple wireless communication standards. For example, the UE 120 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 120 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
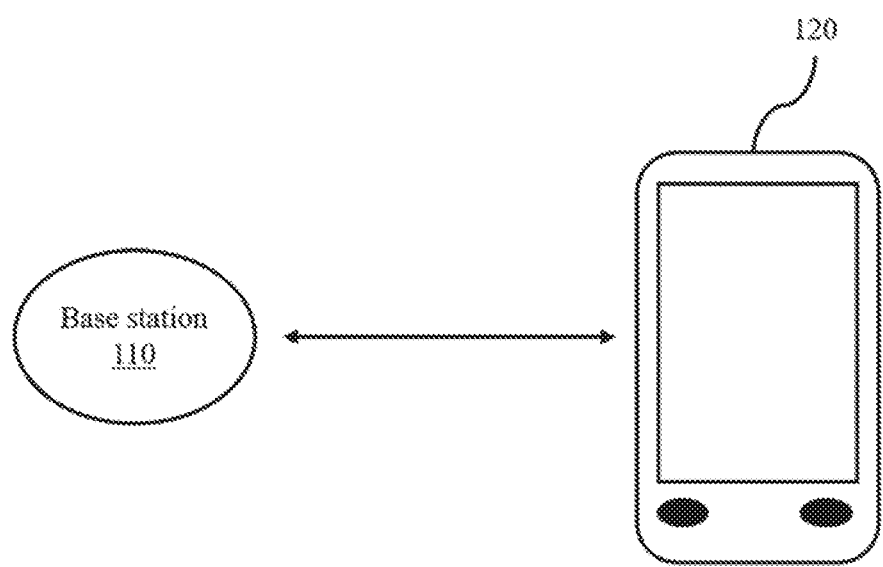
FIG. 2 illustrates a base station (BS) in communication with a user equipment (UE) according to some embodiments.

FIG. 2 illustrates user equipment 120 (e.g., one of the devices 120-1, 120-2 and 120-3) in communication with a base station 110, according to some embodiments. The UE 120 may be a device with cellular communication capability such as a mobile phone, a hand-held device, a computer or a tablet, or virtually any type of wireless device.

The UE 120 may include a processor that is configured to execute program instructions stored in memory. The UE 120 may perform any of the method embodiments described herein by executing such stored instructions. Alternatively, or in addition, the UE 120 may include a programmable hardware element such as an field-programmable gate array (FPGA) that is configured to perform any of the method embodiments described herein, or any portion of any of the method embodiments described herein.

The UE 120 may include one or more antennas for communicating using one or more wireless communication protocols or technologies. In some embodiments, the UE 120 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing) Similarly, the radio may implement one or more receive and transmit chains using the aforementioned hardware. For example, the UE 120 may share one or more parts of a receive and/or transmit chain between multiple wireless communication technologies, such as those discussed above.

In some embodiments, the UE 120 may include separate transmit and/or receive chains (e.g., including separate antennas and other radio components) for each wireless communication protocol with which it is configured to communicate. As a further possibility, the UE 120 may include one or more radios which are shared between multiple wireless communication protocols, and one or more radios which are used exclusively by a single wireless communication protocol. For example, the UE 120 might include a shared radio for communicating using either of LTE or 5G NR (or LTE or 1×RTT or LTE or GSM), and separate radios for communicating using each of Wi-Fi and Bluetooth™. Other configurations are also possible.

Figure 3:
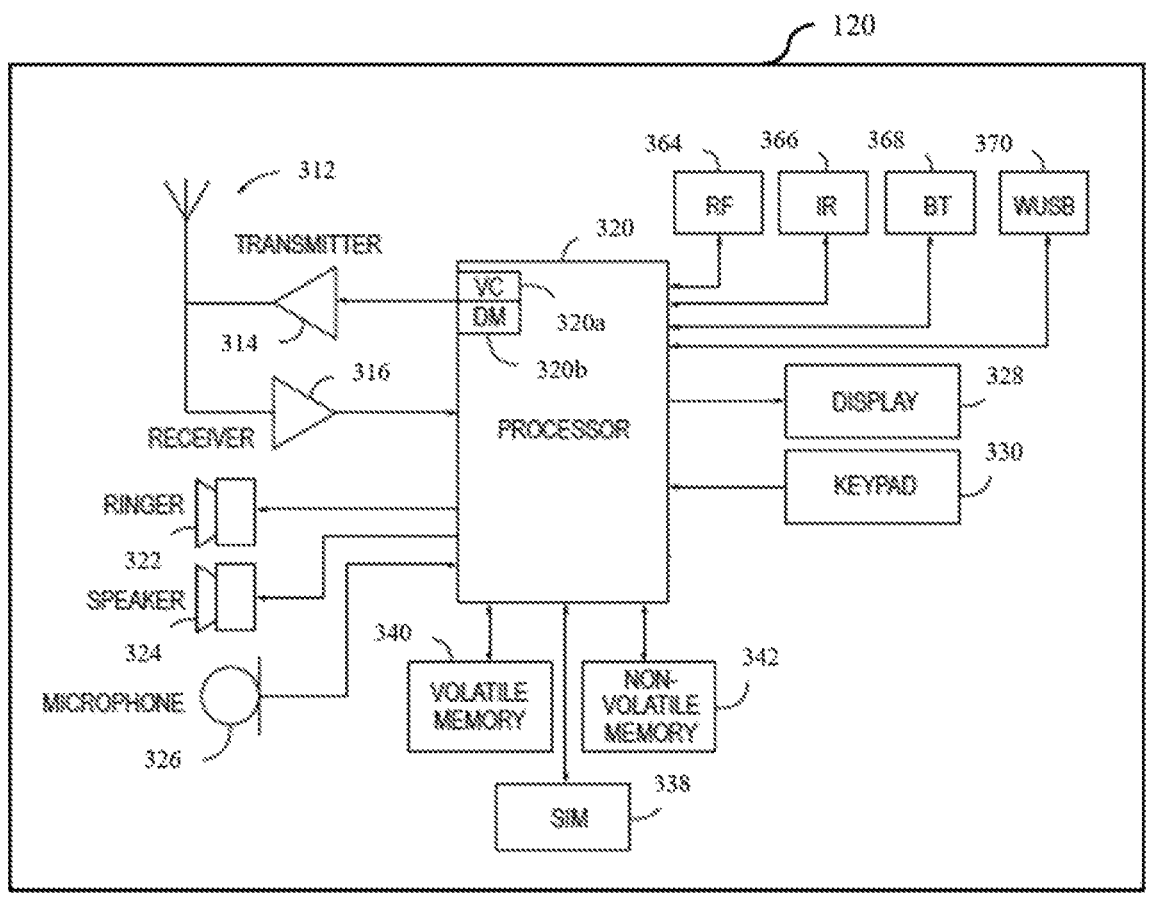
FIG. 3 illustrates a simplified block diagram of a UE according to some embodiments.

FIG. 3 illustrates a simplified block diagram of a UE 120, according to some embodiments. It is noted that the block diagram of the UE 120 of FIG. 3 is only one example of a possible user device. According to embodiments, UE 120 may be a user device, a mobile device or mobile station, a wireless device or wireless station, a desktop computer or computing device, a mobile computing device (e.g., a laptop, notebook, or portable computing device), a tablet and/or a combination of devices, among other devices.

As shown, the UE 120 may include a set of components configured to perform core functions. For example, this set of components may be implemented as a system on chip (SOC), which may include portions for various purposes. Alternatively, this set of components may be implemented as separate components or groups of components for the various purposes. The set of components may be coupled (e.g., communicatively; directly or indirectly) to various other circuits of the UE 120.

The UE 120 may include at least one antenna 312 in communication with a transmitter 314 and a receiver 316. Alternatively, transmit and receive antennas may be separate. The UE 120 may also include a processor 320 configured to provide signals to and receive signals from the transmitter 314 and receiver 316, respectively, and to control the functioning of the UE 120. Processor 320 may be configured to control the functioning of the transmitter 314 and receiver 316 by effecting control signaling via electrical leads to the transmitter 314 and receiver 316. Likewise, the processor 320 may be configured to control other elements of the UE 120 by effecting control signaling via electrical leads connecting processor 320 to the other elements, such as a display or a memory. The processor 320 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 320 may comprise a plurality of processors or processing cores.

The UE 120 may be capable of operating with one or more air interface standards, communication protocols, modulation types, access types, and/or the like. Signals sent and received by the processor 320 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the UE 120 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the UE 120 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the UE 120 may be capable of operating in accordance with 2.5G wireless communication protocols General Packet Radio Service (GPRS), Enhanced Data GSM Environment (EDGE), and/or the like. Further, for example, the UE 120 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The UE 120 may be additionally capable of operating in accordance with 3.9G wireless communication protocols, such as Long Term Evolution (LTE), Evolved Universal Terrestrial Radio Access Network (E-UTRAN), and/or the like. Additionally, for example, the UE 120 may be capable of operating in accordance with 4G wireless communication protocols, such as LTE Advanced, 5G, and/or the like as well as similar wireless communication protocols that may be subsequently developed.

It is understood that the processor 320 may include circuitry for implementing audio/video and logic functions of the UE 120. For example, the processor 320 may comprise a digital signal processor device, a microprocessor device, an analog-to-digital converter, a digital-to-analog converter, and/or the like. Control and signal processing functions of the UE 120 may be allocated between these devices according to their respective capabilities. The processor 320 may additionally comprise an internal voice coder (VC) 320*a*, an internal data modem (DM) 320*b*, and/or the like. Further, the processor 320 may include functionality to operate one or more software programs, which may be stored in memory. In general, the processor 320 and stored software instructions may be configured to cause the UE 120 to perform actions. For example, the processor 320 may be capable of operating a connectivity program, such as a web browser. The connectivity program may allow the UE 120 to transmit and receive web content, such as location-based content, according to a protocol, such as wireless application protocol (WAP), hypertext transfer protocol (HTTP), and/or the like.

The UE 120 may also comprise a user interface including, for example, an earphone or speaker 324, a ringer 322, a microphone 326, a display 328, a user input interface, and/or the like, which may be operationally coupled to the processor 320. The display 328 may, as noted above, include a touch sensitive display, where a user may touch and/or gesture to make selections, enter values, and/or the like. The processor 320 may also include user interface circuitry configured to control at least some functions of one or more elements of the user interface, such as the speaker 324, the ringer 322, the microphone 326, the display 328, and/or the like. The processor 320 and/or user interface circuitry comprising the processor 320 may be configured to control one or more functions of one or more elements of the user interface through computer program instructions, for example, software and/or firmware, stored on a memory accessible to the processor 320, for example, volatile memory 340, non-volatile memory 342, and/or the like. The UE 120 may include a battery for powering various circuits related to the mobile terminal, for example, a circuit to provide mechanical vibration as a detectable output. The user input interface may comprise devices allowing the UE 120 to receive data, such as a keypad 330 (which can be a virtual keyboard presented on display 328 or an externally coupled keyboard) and/or other input devices.

As shown in FIG. 3, the UE 120 may also include one or more mechanisms for sharing and/or obtaining data. For example, UE 120 may include a short-range radio frequency (RF) transceiver and/or interrogator 364, so data may be shared with and/or obtained from electronic devices in accordance with RF techniques. The UE 120 may include other short-range transceivers, such as an infrared (IR) transceiver 366, a Bluetooth™ (BT) transceiver 368 operating using Bluetooth™ wireless technology, a wireless universal serial bus (USB) transceiver 370, a Bluetooth™ Low Energy transceiver, a ZigBee transceiver, an ANT transceiver, a cellular device-to-device transceiver, a wireless local area link transceiver, and/or any other short-range radio technology. The UE 120 and, in particular, the short-range transceiver may be capable of transmitting data to and/or receiving data from electronic devices within the proximity of the apparatus, such as within 10 meters, for example. The UE 120 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The UE 120 may comprise memory, such as a subscriber identity module (SIM) 338, a removable user identity module (R-UIM), an eUICC, an UICC, and/or the like, which may store information elements related to a mobile subscriber. In addition to the SIM, the UE 120 may include other removable and/or fixed memory. The UE 120 may include volatile memory 340 and/or non-volatile memory 342. For example, the volatile memory 340 may include Random Access Memory (RAM) including dynamic and/or static RAM, on-chip or off-chip cache memory, and/or the like. The non-volatile memory 342, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 340, the non-volatile memory 342 may include a cache area for temporary storage of data. At least part of the volatile and/or non-volatile memory may be embedded in the processor 320. The memories may store one or more software programs, instructions, pieces of information, data, and/or the like which may be used by the apparatus for performing operations disclosed herein.

The memories may comprise an identifier, such as an International Mobile Equipment Identification (IMEI) code, capable of uniquely identifying the UE 120. The memories may comprise an identifier, such as an international mobile equipment identification (IMEI) code, capable of uniquely identifying the UE 120. In the example embodiment, the processor 320 may be configured using computer code stored at memory 340 and/or 342 to cause the processor 320 to perform operations disclosed herein.

Some of the embodiments disclosed herein may be implemented in software, hardware, application logic, or a combination of software, hardware, and application logic. The software, application logic, and/or hardware may reside on the memory 340, the processor 320, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

Figure 4:
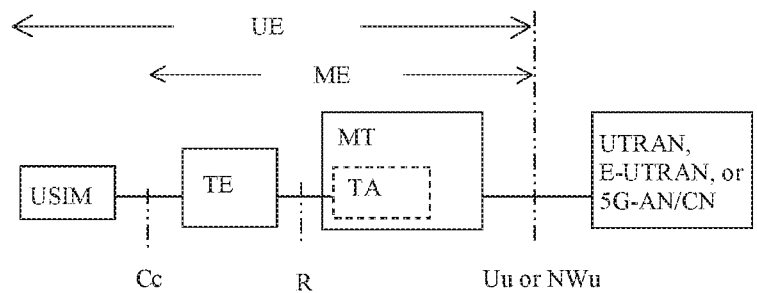
FIG. 4 visualizes functional components of a UE according to some embodiments.

FIG. 4 shows the internal UE architecture according to 3GPP TS 24.002 V16.0.0. The term "Mobile Station" (MS) is synonymous with the term "User Equipment" (UE) in 3G terminology. The UE is connected to the network (UTRAN, E-UTRAN, or 5G Access Network/Core Network) via the Uu or NWu interface. The UE comprises the ME (Mobile Equipment) and the USIM, both being coupled via the Cc interface. The USIM is an application which resides on the UICC (Universal Integrated Circuit Card), an IC card specified in 3GPP TS 31.101. The ME, in turn, comprises the TE (Terminal Equipment) and the MT (Mobile Termination), both being coupled via the R interface. The MT performs core mobile communications functions such as radio transmission termination, radio transmission channel management, speech en-/decoding, error protection, flow control, rate adaption of user data, and mobility management, as well as presenting a man-machine interface to a user. The MT includes the TA (Terminal Adaptor).

As set forth in the outset, the Public Warning System (PWS) is specified by 3GPP specifications for public networks such as a 5G PLMN. The PWS behavior of the UE 120 is defined by USIM in accordance with subclause 4.2.96 of 3GPP TS 31.102 V16.2.0. Hence, if the UE 120 is connected with a PLMN, information in the USIM is used by the UE 120 to determine whether warning messages should be ignored or not in the current PLMN.

Furthermore, the UE 120 may also be connected to a non-public network such as a stand-alone non-public network (SNPN) as specified in 3GPP TS 23.501 V16.3.0. In such situation, the USIM might not be available in the UE 120 operating in SNPN access mode. Hence, the basis for the decision whether warning messages should be ignored or not can be missing in case of the UE 120 being connected to a non-public network such as an SNPN. A UE 120 in SNPN mode may thus not be properly operating with respect to PWS warning messages, or at least not be properly configurable.

According to embodiments, a configuration is provided in the UE 102 to specify the UE's behavior in response to warning messages when being connected to a non-public mobile network such as an SNPN. The configuration is referred to as warning messages reception configuration herein and indicates whether the UE 102 is to accept or ignore the warning messages in the non-public network. Hence, the UE 120 accepts or ignores warning messages received in the non-public network based on the warning messages reception configuration. Providing this configuration to the UE 120 may protect the UE 120 in insecure non-public networks, e.g. against fake alarms from malicious fraudsters.

Figure 5:
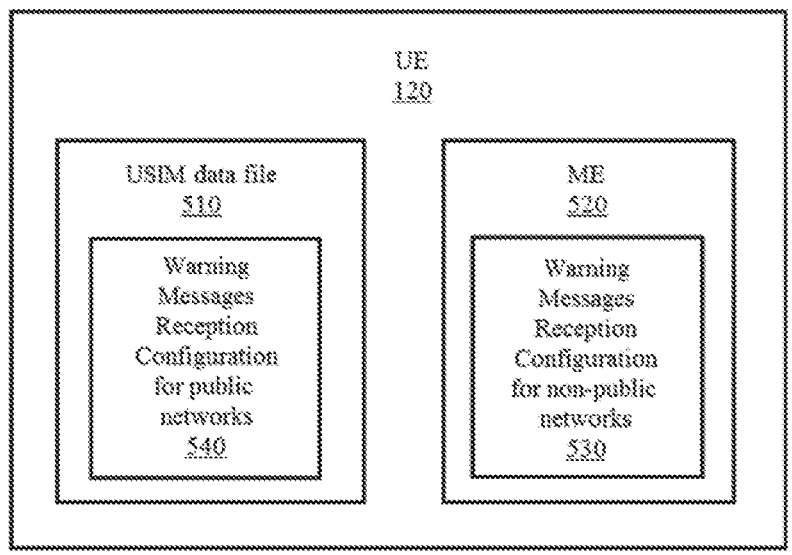
FIG. 5 shows an internal structure of a UE with a warning messages reception configuration according to some embodiments.

FIG. 5 shows an internal structure of a UE 120 with a warning messages reception configuration according to some embodiments.

More specifically, a warning messages reception configuration 530 is provided (e.g. stored) in the ME 520 of the UE 120 indicating whether the UE 120 is to accept or ignore the warning messages. Providing the warning messages reception configuration 530 in the ME part 520 of the UE 102 enables the UE 120 to apply the configuration even if no valid or an empty USIM data file 510 is present or the USIM is not available for the UE 120. Based on this configuration, the UE 120 receives or ignores warning messages broadcasted by the non-public mobile network such as an SNPN.

In some embodiments, the warning messages reception configuration 530 is active and processed by the UE 120 during a network selection procedure (cf. FIG. 7 as explained further below), e.g. in the course of SNPN selection. In this way, the UE 102 is set in a deterministic warning messages reception operation already at an early phase when transiting from idle mode to connected mode.

When a UE 120 is switched on, the UE 120 attempts to make contact with a public land mobile network (PLMN) or stand-alone non-public network (SNPN). The particular PLMN or SNPN to be contacted may be selected either automatically or manually. With respect to the PLMN, the UE normally operates on its home PLMN (HPLMN) or equivalent home PLMN (EHPLMN). A visited PLMN (VPLMN) may be selected, e.g., if the UE 120 loses coverage.

A UE 120 may also be enabled for selecting an SNPN. An SNPN-enabled UE may operate in SNPN access mode. The UE 120 operating in SNPN access mode selects an SNPN for which it is configured with a subscriber identifier and credentials. The UE 120 can have several sets of subscriber identifiers, credentials, and SNPN identities. SNPN selection may occur automatically or manually.

FIG. 6 shows a list of subscriber data with the warning messages reception configuration according to some embodiments To facilitate SNPN selection, the ME 520 of the UE 120 is configured with a list of subscriber data 540 containing zero or more entries. FIG. 6 shows an example of the list of subscriber data according to subclause 4.9.3.0 of 3GPP TS 23.122 V16.4.0. An entry of the list of subscriber data comprises:

a) a subscriber identifier in the form of a SUPI (Subscription Permanent Identifier) containing a network-specific identifier;
b) credentials;
c) an SNPN identity; and
d) optionally, a unified access control configuration indicating for which access identities the ME is configured in the SNPN.

At switch-on or recovery from lack of coverage, the UE 120 may select an SNPN, if available, allowable, and identified by an SNPN identity in an entry of the list of subscriber data 550 in the ME 520. Once the UE 120 selects the SNPN, the UE 120 attempts registrations on the selected SNPN, the subscriber identifier and the credentials from an entry of the list of subscriber data 550 with the SNPN identity matching the selected SNPN. If successful registration is achieved, the UE 120 indicates the selected SNPN.

Figure 7:
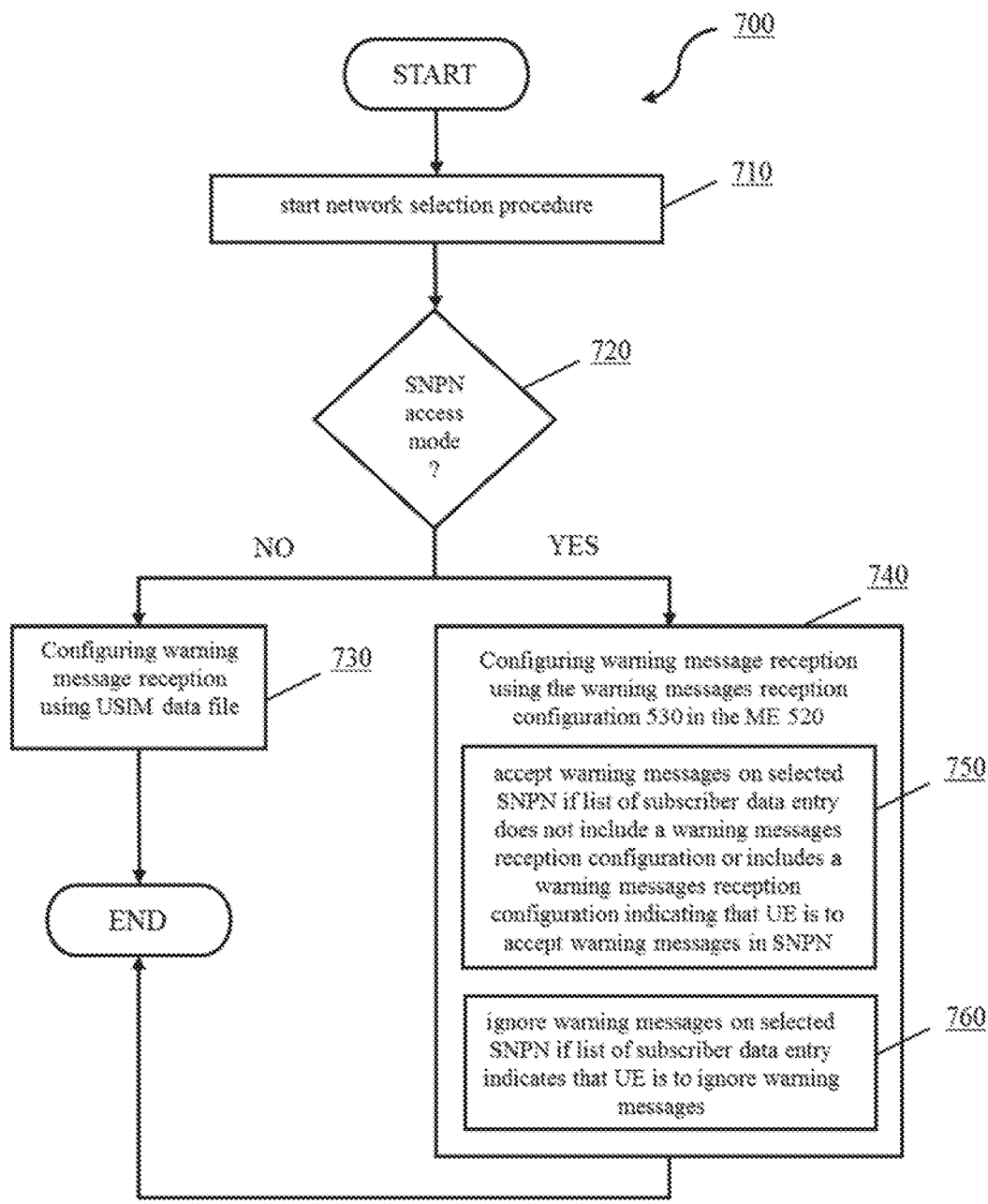
FIG. 7 is a process diagram for configuring warning messages reception according to some embodiments.

Hence, in some embodiments, such network selection procedure, e.g. SNPN selection, is supplemented by configuring the warning message reception operation at this stage (FIG. 7). Such embodiments may be realized by a including the warning messages reception configuration 530 into the list of subscriber data 550 (FIG. 6). This may be effected by enlarging a 3GPP specification such as 3GPP TS 23.122, e.g. subclause 4.9.3.0 of 3GPP TS 23.122 V16.4.0, by a further configuration parameter to the list of subscriber data, such as:

e) optionally, the warning messages reception configuration indicating whether the ME needs to accept or ignore warning messages in the SNPN (see 3GPP TS 23.041).

In some embodiments, the warning messages reception configuration 530 specifies the warning messages operation of the UE 120 as follows.

When the UE 120 is not operating in SNPN access mode, in accordance with 3GPP TS 23.041, e.g. V16.2.0, the USIM data file 510 as defined by 3GPP TS 31.102 is used for configuration of warning messages reception. Further, when the UE 120 is not operating in SNPN access mode, in case of a non-existing or empty USIM data file 510, the UE 120 accepts all warning messages on all PLMNs. As specified in 3GPP TS 31.102, the UE 120 can be configured to ignore all warning messages received in its HPLMN or in a PLMN equivalent to it. As specified in 3GPP TS 31.102, the UE 120 can be configured to ignore all warning messages received in a VPLMN or in a PLMN equivalent to it. A UE 120 in limited service state, and configured according to the USIM data file 510 to display warning messages on that PLMN, shall display warning messages to the user.

When the UE 120 is operating in SNPN access mode, if the entry of the list of subscriber data 550 used in the selected SNPN:

a) does not include a warning messages reception configuration 530; or
b) includes a warning messages reception configuration 530 and the configuration indicates that the UE 120 needs to accept (or process) warning messages in the SNPN;

the UE 120 shall accept warning messages on the selected SNPN. Otherwise, i.e. if the entry of the list of subscriber data 550 used in the selected SNPN includes a warning messages reception configuration 530 and the configuration indicates that the UE 120 ignores warning messages, the UE 120 shall ignore warning messages in the selected SNPN.

In some embodiments, the default setting for the case of an empty warning messages reception configuration 530 may be different, i.e. the UE 120 shall ignore warning messages in the selected SNPN if the entry of the list of subscriber data 550 used in the selected SNPN does not include a warning messages reception configuration 530.

Hence, in some embodiments, the UE 120 chooses the basis for configuring the warning messages operation dependent on the type of the selected network and corresponding access mode. If the UE selects a PLNM, the authoritative warning messages reception configuration 540 is given by the USIM data file 510. Hence, the UE 120 uses the USIM data file 510 for configuring warning messages reception when the UE 120 is not operating in an SNPN access mode. On the other hand, if the UE 120 selects an SNPN and thus is in SNPN access mode, the authoritative warning messages reception configuration 530 is given by the ME 520, such as the enlarged list of subscriber data 550 as explained above and shown by FIG. 6. Hence, the UE 120 uses the warning messages reception configuration 530 in the ME 520 for configuring warning messages reception when the UE 120 is operating in the SNPN access mode.

A network selection procedure 700 according to some embodiments is visualized by FIG. 7. The UE 120 starts the networks selection procedure in 710, for example after switch-on or after regaining coverage. The UE 120 then determines in 720 whether or not the UE 120 is in SNPN access mode. If not, the UE 120 configures the warning message reception operation using the USIM data file 510 in 730. If affirmative, the UE 120 configures the warning message reception operation using the warning messages reception configuration 530 in the ME 520 in 740. As described before, this includes to accept warning messages on the selected SNPN in 750 if the list of subscriber data entry does not include a warning messages reception configuration 530 or includes a warning messages reception configuration 530 indicating that UE 120 is to accept warning messages in SNPN, or to ignore warning messages on selected SNPN in 760 if the list of subscriber data entry indicates that UE 120 is to ignore warning messages.

In some embodiments, the warning messages reception configuration 530 in the ME 520, such as the enlarged list of subscriber data 540, is one-dimensional and prescribes, per SNPN identified by the SNPN identity, whether to receive any warning messages or whether to ignore any warning messages. In some of these embodiments, warning messages reception configuration in the ME 520 is represented by one bit per entry of the list of subscriber data 550, wherein, for example, a bit value of 0 indicates to ignore any warning messages for the corresponding SNPN and a bit value of 1 indicates to receive any warning messages for the corresponding SNPN. For example, as shown by FIG. 6, the UE 120 will ignore warning messages received in the SNPNs with SNPN ID A and E, but will receive warning messages in the SNPNs with SNPN ID B and D.

In some embodiments, warning messages reception configuration for equivalent SNPNs is supported. In this case, the warning messages reception configuration 530 in the ME 520, such as the enlarged list of subscriber data 550, is extended to a multi-dimensional parameter, such as a two-bit parameter. For example, one bit information may indicate whether the UE should accept or ignore warning messages in the SNPN indicated in the entry of the list of subscriber data 550 and the other bit information may indicate whether the UE should accept or ignore warning messages in the SNPN(s) equivalent to the SNPN indicated in the entry of the list of subscriber data 550. In another example, one bit information may indicate whether the UE should accept or ignore warning messages in the SNPN indicated in the entry of the list of subscriber data 550 and the SNPN(s) equivalent to the SNPN indicated in the entry of the list of subscriber data 550. In these examples, there may be an additional bit information which indicates whether the UE should accept or ignore warning messages in a visited SNPN for the entry of the list of subscriber data 550. In such embodiments, the warning messages reception configuration 530 may thus comprise multiple bits per entry of the list of subscriber data 550, providing differentiated warning messages reception options per entry. For example, as shown by FIG. 6, the UE 120 will receive warning messages received in the SNPN with SNPN ID C, but will ignore warning messages in SNPNs that are equivalent to the SNPN with SNPN ID C.

The subject matter described herein may be embodied in systems, apparatus, methods, and/or articles depending on the desired configuration. For example, the user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and sub-combinations of the disclosed features and/or combinations and sub-combinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least". The use of the phase "such as" means "such as for example" unless otherwise indicated.

The invention claimed is:

1. A user equipment, comprising:
   at least one processor; and
   at least one memory storing instructions that, when executed by the at least one processor, cause the user equipment at least to:
   accept or ignore warning messages received on a selected stand-alone non-public network (SNPN), based on a warning messages reception configuration comprised in a list of subscriber data within the at least one memory,
   wherein warning messages received on the selected SNPN are to be accepted, based on an entry of the list of subscriber data used for the selected SNPN either not including a warning messages reception configuration or including a warning messages reception configuration indicating that the user equipment is to accept warning messages received on the selected SNPN, and
   wherein warning messages received on the selected SNPN are to be ignored, based on the entry of the list of subscriber data used for the selected SNPN indicating that the user equipment is to ignore warning messages received on the selected SNPN,
   wherein the user equipment is operable on the selected SNPN.

2. The user equipment of claim 1, further comprising: a mobile equipment (ME), wherein the warning messages reception configuration is comprised in the ME.

3. The user equipment of claim 1, wherein the instructions, when executed by the at least one processor, further cause the user equipment at least to:
   process the warning messages reception configuration during a network selection procedure.

4. The user equipment of claim 2, further comprising: a universal subscriber identity module, (USIM) data file including a configuration of warning messages reception for public land mobile networks (PLMNs), wherein the instructions, when executed by the at least one processor, further cause the user equipment at least to:
   use the USIM data file for configuring warning messages reception, based on the user equipment not operating in an SNPN access mode,
   use the warning messages reception configuration in the ME for configuring warning messages reception, based on the user equipment operating in the SNPN access mode.

5. The user equipment of claim 1, wherein the warning messages reception configuration comprises a multi-dimensional parameter indicating that the user equipment accepts or ignores warning messages received on the selected SNPN and other non-public communications networks equivalent to the selected SNPN.

6. A method of a user equipment, the method comprising:
   accepting or ignoring warning messages received on a selected stand-alone non-public network (SNPN), based on a warning messages reception configuration comprised in a list of subscriber data within at least one memory of the user equipment, wherein warning messages received on the selected SNPN are to be accepted, based on an entry of the list of subscriber data used for the selected SNPN either not including a warning messages reception configuration or including a warning messages reception configuration indicating that the user equipment is to accept warning messages received on the selected SNPN, and wherein warning messages received on the selected SNPN are to be ignored, based on the entry of the list of subscriber data used for the selected SNPN indicating that the user equipment is to ignore warning messages received on the selected SNPN, wherein the user equipment is operable on the selected SNPN.

7. The method of claim 4, wherein the warning messages reception configuration is comprised in a mobile equipment (ME) of the user equipment.

8. The method of claim 4, comprising:

processing the warning messages reception configuration during a network selection procedure.

9. The method of claim 7, wherein the user equipment comprises a universal subscriber identity module (USIM) data file including a configuration of warning messages reception for public land mobile networks (PLMNs) and wherein the method further comprises:

using the USIM data file for configuring warning messages reception, based on the UE not operating in an SNPN access mode; and using the warning messages reception configuration in the ME for configuring warning messages reception, based on the user equipment operating in the SNPN access mode.

10. The method of claim 6, wherein the warning messages reception configuration comprises a multi-dimensional parameter indicating that the user equipment accepts or ignores warning messages received on the selected SNPN and other non-public communications networks equivalent to the selected SNPN.

11. A non-transitory computer-readable medium comprising instructions, when executed by at least one processor of a user equipment, cause the user equipment at least to:

accept or ignore warning messages received on a selected stand-alone non-public network (SNPN), based on a warning messages reception configuration comprised in a list of subscriber data within at least one memory of the user equipment, wherein warning messages received on the selected SNPN are to be accepted, based on an entry of the list of subscriber data used for the selected SNPN either not including a warning messages reception configuration or including a warning messages reception configuration indicating that the user equipment is to accept warning messages received on the selected SNPN, and warning messages received on the selected SNPN are to be ignored, based on the entry of the list of subscriber data used for the selected SNPN indicating that the user equipment is to ignore warning messages received on the selected SNPN, wherein the user equipment is operable on the selected SNPN.

* * * * *